United States Patent Office

3,562,797
Patented Feb. 9, 1971

3,562,797
PRODUCTION OF MONO-OLEFINS
Shengen Hu, St. Louis, Mo., assignor to Monsanto Company, St. Louis, Mo., a corporation of Delaware
No Drawing. Filed Jan. 9, 1969, Ser. No. 790,161
Int. Cl. B01j 11/40; C07c 11/04
U.S. Cl. 260—683.3
11 Claims

ABSTRACT OF THE DISCLOSURE

Methods for preparing mono-olefins, useful in the preparation of detergent alkylates, wherein a long chain paraffin feed material is passed in the presence of oxygen at elevated temperatures into effective contact with Type A molecular sieve to thereby result in selective dehydrogenation of the paraffin.

---

This invention relates to the preparation of long chain mono-olefins and more particularly, the invention relates to the selective oxidative dehydrogenation of long chain paraffins using Type A molecular sieve as a catalyst.

One of the most successful commercial processes for preparing detergent alkylates comprises passing a stream of straight chain paraffins of proper chain length into contact with a suitable dehydrogenation catalyst, passing the resulting mixture of paraffins and mono-olefins to an alkylation reactor where the olefins are reacted with an aromatic material such as benzene in the presence of a suitable alkylation catalyst, and thereafter recovering the unreacted paraffins for recycle to the dehydrogenation reactor. While numerous types of dehydrogenation catalysts have been suggested in the prior art, the most widely used catalysts in each instance contain a noble metal such as platinum or palladium. As is well known, platinum and other noble metals are exceedingly expensive materials. In addition, the tendency of platinum catalysts to become deactivated by the accumulation of carbonaceous deposits and to become poisoned by materials normally present in trace amounts in paraffin fed streams is also well known, and it has been found to be necessary in dehydrogenation reactions conducted with the aid of a platinum catalyst to frequently subject the catalyst to regeneration procedures to remove accumulated carbonaceous deposits and to periodically completely rework the catalyst, recover and purify the noble metal contained therein and to redeposit the recovered noble metal on fresh support material. It will be seen, therefore, that a process using a relatively inexpensive catalyst material which is highly selective in the manufacture of mono-olefins and which does not become rapidly deactivated by carbonaceous deposits or poisoned by catalyst poisons normally present in paraffin feed stocks would constitute an important advance in the art.

In accordance with this invention, it has been found that Type A synthetic zeolites, otherwise commonly referred to as Type A molecular sieves, act in the presence of oxygen to selectively dehydrogenate normal long chain paraffins to mono-olefins. The reaction possibly proceeds through an oxygen-containing intermediate compound but, if so, the intermediate need not be isolated and the mono-olefin can be recovered directly from a stream of material passed into effective catalytic contact with the molecular sieve catalytic material.

The use of molecular sieves of various types for the formation of unsaturated hydrocarbons has been suggested in numerous instances in the prior art and, for example, such a process is disclosed in U.S. Pat. No. 3,294,858. In most instances, however, the prior art processes using zeolite catalysts effected the formation of olefins not by dehydrogenation but by cracking of the paraffin feed material. Since the point of fissure of such a cracking process can be at any point in the hydrocarbon chain of the paraffin feed material, such processes result in the production of a wide range of olefins of all theoretically possible chain lengths and require the use of a feed stock having an average chain length longer than that of the desired olefin material. It is, therefore, an advantage of the process of the present invention that cracking of the aliphatic chain occurs, if at all, only to a small degree and that the olefin product has substantially the same average chain length as that of the paraffin feed material. It further is believed to be quite surprising that in the presence of oxygen under the conditions of the present invention, the cracking which has been reported to occur in prior art as illustrated by U.S. Pat. No. 3,294,858, is largely avoided.

Not only is it possible in accordance with the process of the present invention to avoid almost totally the cracking of the paraffin feed stock, but there is substantially no isomerization under normal operating conditions and the product has substantially the same chain structure as the paraffin feed material. Also, it is possible to produce a product remarkably low in diolefins, triolefins and aromatics (DTA) and substantially free of oxygen-containing by-products. Oxidation of paraffins to produce oxygen-containing derivatives has been suggested in the prior art and it is believed to be quite surprising that by straight forward catalytic oxidation in accordance with this invention there is produced a mono-olefin product substantially free of oxygen-containing by-products.

The above is not to say that oxidative dehydrogenation of hydrocarbons is a novel concept. Catalytic dehydrogenation of hydrocarbons in the presence of oxygen has been suggested in numerous instances in the prior art and, for example, oxidative dehydrogenation processes are disclosed in U.S. Pat. No. 3,207,811 and U.S. Pat. No. 3,318,967. Prior art oxidative dehydrogenation processes, however, have been largely useful in the production of short chain diolefins such as butadiene from mono-olefins and are not completely satisfactory for use in the production of detergent grade long chain mono-olefins. A first reason why this is true is that selectively converting paraffins to mono-olefins is much more difficult than converting short chain mono-olefins to diolefins. If one attempts to employ the dehydrogenation reactions disclosed in the prior art for the selective formation of mono-olefins from paraffins, in most instances large quantities of polyunsaturates are formed. The presence of polyunsaturates in detergent grade olefins is highly undesirable since such materials react with benzene and/or with themselves to form high molecular weight substances completely unsuited for the manufacture of household detergents. A second disadvantage of prior art processes as above described for the manufacture of detergent alkylates is that they normally require the presence of a chlorine-containing gas in the feed stream or the use of a chlorine liberating catalyst, and this results in undesirable contamination of the olefin product. It is an advantage of the process of the present invention that it is highly selective in the formation of mono-olefins in preference to polyunsaturates and a further advantage that no chlorine-containing material need be present either in the feed stream or in the catalyst.

It is a further advantage of the process of the present invention that the dehydrogenation process is conducted in the presence of oxygen. Oxygen normally interferes with the operation of noble metal catalysts and dehydrogenation reactions conducted in the presence of noble metal catalysts are not normally conducted in the presence of oxygen. It is believed, however, that the presence of oxygen reduces the rate of formation of carbonaceous deposits on the catalyst and is one reason that in the process of this invention the catalyst can be employed for long periods of time without need for regeneration.

It is a still further advantage of the process of the present invention that the molecular sieve catalyst is relatively insensitive to the usual catalyst poisons. The noble metal catalysts of the prior art are extremely sensitive to catalyst poisons and either one must employ a highly purified feed stock or one must resort to frequent replacement of the catalyst. Processes in accordance with the present invention utilizing a molecular sieve catalyst can be conducted for exceedingly long periods of time, even when utilizing a relatively impure feed stock, without the need for catalyst replacement.

The molecular sieve catalyst used in accordance with the present invention is a synthetic type A zeolite having a pore diameter of 3 to 5 A. inclusive. There are numerous types of synthetic zeolites which are in each instance different crystalline forms of synthetic alumino-silicates. It is conventional to designate the various types of synthetic zeolites by a letter such as type "A," type "Y," and type "X" or by a letter-number combination such as type "ZK-5." Only the type "A" synthetic zeolites can satisfactorily be employed in accordance with the present invention. Type A synthetic zeolites are well known materials and are commercially available from several suppliers in the U.S.A. and other countries.

Type A zeolite in its most usual form has a pore diameter, or perhaps more properly, a pore opening diameter of about 4 A. By exchanging a portion, usually about 75 percent by weight, of the sodium in the usual 4 A. type A zeolite for calcium or potassium, the pore opening diameter can be varied to produce sieves having approximately 5 A. and approximately 3 A. pore openings respectively. Any of these materials can be satisfactorily employed as a catalyst in the present invention.

The synthetic zeolites, as previously mentioned, are alumino-silicates and normally contain replaceable metallic ions, usually sodium, potassium or calcium ions, which can be totally or partially replaced with ions of almost any desired metal by known techniques and it has been previously suggested in connection with several prior art processes that an active catalyst be made by replacing 50% to 90% of the replaceable metal ions normally present in a synthetic zeolite with ions of a catalytically active metal such as iron, cobalt, nickel, chromium, manganese, copper, or gold. Although a catalyst can be employed in accordance with this invention in which a minor portion, i.e. not more than about 5% by weight of the replaceable metal ions normally present in a type A synthetic zeolite has been replaced with ions of one or more metals such as listed above, it has been found that even the replacement in such minor amounts of the metal ions normally present can and usually does result in a loss of selectivity, and a synthetic zeolite in which 50% to 90% by weight of the calcium, sodium, or potassium ions have been replaced by an equivalent weight of ions of a catalytically active metal such as listed above is completely unsatisfactory in accordance with this invention. Therefore, in accordance with this invention, one should normally employ a type A synthetic zeolite in which not more than 5%, on an equivalent weight basis, of the replaceable metal ions in the alumino-silicate are other than sodium, potassium, or calcium ions, and preferably in accordance with this invention one employs a type A synthetic zeolite in which substantially all of the replaceable metallic ions are selected from the group consisting of sodium, calcium, and potassium ions.

The synthetic zeolite catalyst material can have any suitable physical form and, for example, can be in the form of tablets, pellets, rods, or the like. Type A synthetic zeolites are most readily available in the form of 8-12 mesh, U.S. Standard Sieve, granules, and it is an advantage of the invention that this readily available form of the zeolite can be suitably employed. In use, the catalyst can be suitably in the form of a fixed bed of pellets or granules through which the feed mixture can be passed or it can be in any other suitable form. For example, the catalyst can be in the form of a plurality of suspended rods providing a torturous flow path for the reactant feed stream or it can be in the form of a lining material for an elongated reactor tube or in any other physical form known to those skilled in the art to be suitable for conducting catalytic reactions.

There can be employed in accordance with the present invention straight chain paraffins having a chain length of from about 6 to 24 carbon atoms or mixtures of straight chain paraffins having an average chain length of from 8 to 24 carbon atoms. The preferred chain length or average chain length for most applications is from 10 to 15 carbon atoms. Since by most production techniques one obtains a mixture of normal paraffins of varying chain lengths rather than a single normal paraffin, it is an advantage of the invention that mixtures of normal paraffins can be suitably processed. For most end use applications, it is desirable that such a mixture of paraffins have a range of chain lengths of not more than about 6 carbon atoms and preferably not more than about 3 or 4 carbon atoms, but if desired, mixtures having a wider range of chain lengths can readily be processed in accordance with this invention. Examples of paraffin mixtures preferred for detergent applications include a mixture containing $C_{10}$ to $C_{14}$ paraffins having an average chain length of about 12, or a mixture containing $C_{12}$ to $C_{15}$ paraffins having an average chain length of about 13 carbon atoms.

The paraffin materials utilized in accordance with this invention can be derived from any suitable source and can, for example, be prepared by reduction of long chain aliphatics produced by Fischer-Tropsch synthesis, or by any other suitable means. The desired normal paraffins, however, are most readily obtained from petroleum sources by known methods of separation. For example, a suitable paraffin material can be obtained by passing a petroleum fraction of a boiling range selected to include paraffins of the proper chain length for use as detergents to a molecular sieve bed containing a synthetic zeolite having a pore diameter of from 5 A. to 15 A. and preferably a pore size of about 5 A. Such molecular sieves and methods for their use in separating paraffins from petroleum feed stocks are well known in the art and the molecular sieve materials are commercially available from numerous suppliers.

The paraffin feed material used in accordance with this invention is vaporized and mixed with the desired quantity of oxygen before being passed into contact with the type A synthetic zeolite catalyst. It is an advantage of the process that the reaction is normally conducted at atmospheric pressure, but if necessary to achieve vaporization at the desired reaction temperature, reduced pressures can be employed. In fact, unless a reaction temperature is selected which requires a reduced pressure for vaporization, any suitable pressure can be utilized. Any conventional procedure and apparatus can be employed to vaporize the paraffin feed stock or alternatively, the paraffin feed material can be vaporized by its initial contact with the heated catalyst.

The required oxygen can be supplied to the feed stream in any desired manner using conventional equipment. A metering pump can be employed if desired for precise process control, although the use of such is not necessary since the ratio of oxygen to paraffin can suitably be varied over a wide range. In most instances, however, the molar ratio of oxygen to paraffin should not be permitted to drop below about 0.5:1 and is preferably at least 1:1. There is no upper limit as to the amount of oxygen that may be present, but seldom is there any advantage in using a molar ratio of oxygen to paraffin in excess of about 100:1, and in most instances there is no advantage in using a ratio of oxygen to paraffin in excess of about 20:1. The preferred range with respect to the molar ratio of oxygen to paraffin is from about 2:1 to 20:1.

The paraffin feed stream need contain nothing other than the paraffins to be dehydrogenated and the required amount of oxygen, although other materials can be present if desired. For example, one can suitably have and preferably does have an inert diluent, such as nitrogen, carbon dioxide, or helium, present in the feed stream to improve selectively, facilitate heat removal and assist in temperature control. That an inert diluent is preferably employed is an advantage because it permits one to use air as a source of the necessary oxygen. A stream of nitrogen or other inert gas is also useful in some instances to sweep the paraffin feed materials from the vaporizer. The inert gas can suitably constitute up to 99.5 mole percent of the feed stream but preferably constitutes from about 80 to 98 mole percent of the feed stream. The preferred inert gas-paraffin molar ratio is from about 10:1 to 100:1 and the preferred inert gas-oxygen molar ratio is from about 10:1 to 25:1. One can also add various promoters or the like to the feed stream although the addition of such promoters has not been found to be advantageous.

The dehydrogenation reaction can be conducted at any temperature within the range of about 300° C. to about 600° C. If the reaction temperature is allowed to drop below about 300° C., one fails to obtain a satisfactory degree of conversion of the paraffin feed stock to mono-olefin product and with the shorter chain paraffins, a minimum lower temperature of 340° C. to 360° C. should be employed. At the other extreme, the reaction temperature should not be permitted to exceed about 600° C. because at higher temperatures, objectionable combustion of the feed material is experienced. In most instances, the preferred reaction temperature range is from about 450° C. to about 550° C.

Catalyst contact time can vary within relatively wide limits with satisfactory results, and one can employ a ratio of grams of catalysts to moles of total feed per hour ($W/F$) of about 12 or less, although the $W/F$ ratio is preferably less than about 4. At high $W/F$ ratios, excessive decomposition of the paraffin feed material is encountered, large quantities of oxygenated compounds are produced, and a loss of selectively is experienced. From a selectivity point of view and on the basis of over-all yield, the lower the $W/F$ ratio, the better, and one can, for example, employ $W/F$ ratios as low as about 0.1, but at $W/F$ ratios less than about 0.5, the conversion per pass in some instances may be objectionably low, and the use of a $W/F$ ratio of at least about 1, all factors considered, is usually desirable.

Following contact of the feed stream with the catalyst material, the mono-olefin product can be recovered from unreacted paraffins, inert diluents, etc., by any desired procedure. The most satisfactory procedure in most instances comprises mixing in the presence of a suitable alkylation catalyst the hydrocarbon mixture obtained from the dehydrogenation reactor with an amount of aromatic material such as benzene in excess of that theoretically required to react with the mono-olefins in the mixture. By this procedure, the olefins are reacted with the aromatic material to form an alkylate which can readily be separated by distillation from unreacted paraffins. If a procedure such as this is not utilized, distillation cannot in most instances be satisfactorily employed for mono-olefin recovery because of the small difference in the boiling points of straight chain paraffins and olefins of the same chain lengths.

The invention will now be illustrated by the following examples in which all parts are by weight unless otherwise indicated:

EXAMPLE I

In a tubular catalytic reactor, there is placed a quantity of granulated 8–12 mesh, U.S. Standard Sieve, type 5A synthetic zeolites sufficient to provide a bed thickness of 24 inches. This material is commercially available and has an average pore opening diameter of approximately 5 A. The tubular reactor is provided with electrical heaters for preheating the catalyst bed to a suitable operating temperature, and the entrance port of the tubular reactor is connected in series flow relationship with a vaporizer suitable for use in vaporizing a paraffin feed stock. Means are provided for introducing a preheated stream of inert gas such as nitrogen into the vaporizer to aid in sweeping vaporized paraffins from the vaporizer, and means are additionally provided for introducing air at a metered rate into the reactant stream intermediate the vaporizer and tubular reactor. The exhaust port of the reactor is connected in series flow relationship with a condenser for liquifying liquifiable components of the gas stream exiting the reactor. The catalyst bed is preheated to a desired reaction temperature within the range of 300° C. to 600° C., and nitrogen and paraffin feed material are metered into the vaporizer at the desired rate while an amount of air necessary to provide the desired oxygen to hydrocarbon ratio ($O_2/HC$) is continually metered into the reactant stream intermediate the vaporizer and reactor.

The results obtained using n-dodecane as a feed in a procedure as described above are set forth in the following table:

TABLE I

| Average catalyst bed temperature, °C. | Feed composition, mol percent | | | $W/F$, g.-hr./mol | Hydrocarbon product composition, weight percent | | |
|---|---|---|---|---|---|---|---|
| | $O_2$ | HC | $O_2/HC$ | | MO | LE[1] | DTA[2] |
| 345 | 4.8 | 4.3 | 1.1 | 2.2 | 1.5 | 0 | 0 |
| 345 | 4.7 | 5.3 | 0.9 | 2.8 | 1.4 | 0 | Trace |
| 325 | 4.7 | 5.3 | 0.9 | 2.8 | 1.0 | 0 | Trace |
| 428 | 8.8 | 2.5 | 3.6 | 2.8 | 6.4 | 0.1 | 0.6 |
| 558 | 8.8 | 2.5 | 3.6 | 2.8 | 11.1 | 1.1 | 3.5 |
| 506 | 8.9 | 0.6 | 14.8 | 1.5 | 11.0 | 0.2 | 1.9 |

[1] Light ends produced by cracking.
[2] Diolefins, triolefins, and aromatics.

From the results set forth above, it will be seen that at low reaction temperatures, even though the conversion per pass with a 24″ bed is relatively low, the process is substantially 100 percent selective in the formation of mono-olefins, and at a near optimum temperature of approximately 500° C., a relatively high 11 percent per pass conversion to mono-olefins is obtained with a selectivity of approximately 85%.

EXAMPLE II

The procedure of Example I is repeated except that the bed is packed with type 4A synthetic zeolite granules having a pore opening of approximately 4 A.; the average temperature of the catalyst bed is 519° C.; the $W/F$ ratio is 1.4 grams-hr./mole; the mole percent of oxygen in the feed is 8.9%; and the mole percent of n-dodecane in the feed is 1.3% so that the $O_2/HC$ ratio is 6.7. In accordance with this procedure using a 24″ catalyst bed, a 9.6 weight percent conversion of the n-dodecane to mono-olefin was obtained per pass with the production of only 1.6 weight percent light ends, no detectable quantities of oxygenated compounds, and only 0.9 weight percent combined diolefins, triolefins, and aromatics. Therefore, based upon reacted paraffins, the process was 79 percent efficient in the production of mono-olefins.

In comparable tests conducted using a type 10X synthetic zeolite as catalyst, large quantities of oxygenated compounds were formed and only 38% of the reacted paraffin was transformed to mono-olefins. Similarly, when using Alundum as catalyst in a further test, large quantities of oxygenated compounds were also formed and only 24 percent of the reacted paraffin was transformed to mono-olefins. Expressed differently, the selectivity in accordance with this invention of a type A synthetic zeolite used as a catalyst is unique and under the conditions of the above example is 79% whereas, under comparable conditions, the selectivities of type 10X synthetic zeolite and Alundum, due primarily to the formation of oxygenated compounds, are only 38 percent and 24 percent respectively.

EXAMPLE III

The procedure of Example I is repeated except that a bed thickness of 5″ is employed utilizing successively type 3A synthetic zeolite granules having a composition of $$0.6K_2O:0.4Na_2O:Al_2O_3:2SiO_2:xH_2O$$

type 4A synthetic zeolite granules having a composition of $$1.0Na_2O:Al_2O_3:2SiO_2:xH_2O$$

and type 5A synthetic zeolite granules having a composition of $$0.8CaO:0.2Na_2O:Al_2O_3:2SiO_2:xH_2O$$

the $W/F$ ratio is 1.6; and the feed stream contains 8.8 mole percent oxygen and 2.3 mole percent n-dodecane so so that the $O_2/HC$ ratio is 3.6. Results which were obtained in accordance with this procedure are set forth in the following table:

TABLE II

| Sieve type | Avg. temp., °C. | Product composition, weight percent | | | Selectivity |
| --- | --- | --- | --- | --- | --- |
| | | MO | LE | DTA | |
| 3A | 506 | 11.3 | 1.3 | 3.5 | 70 |
| 4A | 497 | 9.7 | 1.5 | 2.9 | 69 |
| 5A | 516 | 7.1 | 0.3 | 1.6 | 78 |

From the above results, it will be seen that type 3A synthetic zeolite is the most active catalyst which one can employ in accordance with the present invention, but under the conditions employed above, is slightly less selective than type 5A synthetic zeolite.

EXAMPLE IV

The procedure of Example I is repeated utilizing various paraffins as feed materials except that a 5″ bed of type 3A synthetic zeolite catalyst is employed. Results obtained using this procedure under the specified process conditions are set forth in the following table:

TABLE III

| Feed | °C. temp. | $W/F$ | Feed compositions, volume percent | | | MO, wt. percent | Selectivity, percent |
| --- | --- | --- | --- | --- | --- | --- | --- |
| | | | $O_2$ | HC | $O_2/HC$ | | |
| n-$C_{14}H_{30}$ | 448–495 | 1.1 | 5.9 | 1.2 | 4.9 | 10.0 | 76 |
| n-$C_9H_{20}$ | 495–562 | 1.6 | 8.7 | 2.9 | 3.0 | 10.3 | 80 |
| n-$C_6H_{14}$ | 490–550 | 1.8 | 8.6 | 4.1 | 2.1 | 4.1 | 91 |

From the above results, it will be seen that while the process of the present invention under favorable conditions remains highly selective using a paraffin feed material of only 6 carbon atoms chain length, the conversion per pass has begun to drop as compared to the conversions obtainable when employing longer chain length paraffins as feed materials. It is believed to be quite surprising that with paraffins having a chain length of less than 6 carbon atoms, the process is completely unsatisfactory. For example, with n-butane, even under favorable process conditions such as specified in the above example, only one weight percent conversion to mono-olefins per pass was obtained and the selectivity of the process fell to an unsatisfactory level of 16 percent.

EXAMPLE V

The procedure of Example I is repeated except there is employed a 24″ catalyst bed formed of 8 to 12 mesh granules of type 3A synthetic zeolite; a paraffin feed consisting essentially of a mixture of $C_{11}$–$C_{14}$ n-paraffins having a boiling range of from 200° C. to 255° C. prepared by molecularly sieving a petroleum fraction having a boiling range of from 190° C. to 260° C., distilling and hydrogenating to reduce impurities; a catalyst bed temperature of from 500–510° C.; a feed composition of 9 mole percent oxygen and 0.6 percent paraffin to thereby provide an $O_2/HC$ ratio of approximately 15; and a $W/F$ ratio of 1.5 grams-hr./mole. In accordance with the modified procedure of this example, the condensate obtained from the gases leaving the reactor analyzes approximately 10 percent mono-olefin.

100 parts by weight of benzene and 67 parts of anhydrous HF are placed in a suitable alkylation reactor equipped with a stirrer, thermocouple, cooling coil, and sample port. The benzene is heated to a temperature of about 50° C. and there is added over a period of about 5 to 10 minutes while maintaining the reaction mixture at a temperature of 50 °C. and with agitation, 255 parts by weight of the mono-olefin containing condensate prepared above. The reaction mixture is then stirred at a temperature of 50° C. for an additional 20 minutes after which it is allowed to remain in a quiescent condition for a period of at least 10 minutes. The lower catalyst phase and the upper alkylated liquor phase are then separated, and the alkylated liquor is fractionally distilled to remove unreacted benzene, HF and unreacted paraffins. An alkylbenzene fraction is collected boiling at from about 110° C. to about 170° C. at 2 mm. of mercury. This alkylbenzene fraction is of detergent quality and can be sulfonated and neutralized with NaOH by conventional techniques to produce an excellent sodium alkylbenzene sulfonate anionic detergent active.

Having thus described my invention and several preferred embodiments thereof, what I claim and desire to secure Letters Patent is:

1. A process for making straight chain mono-olefins having from 6 to 24 carbon atoms and suitable for use as intermediates in the manufacture of detergent alkylates which method comprises contacting a straight chain paraffin in vapor form with a type A synthetic zeolite having a pore opening diameter of from about 3 to about 5 angstrom units, said contact being effected at a temperature of from about 300° C. to about 600° C. and in the presence of an amount of oxygen such that the oxygen to hydrocarbon ratio is at least about 0.5:1 but not in excess of about 100:1, whereby said paraffin is selectively dehydrogenated to form said olefin.

2. A process in accordance with claim 1 wherein said contact is conducted in the presence of an inert diluent, the molar ratio of oxygen to hydrocarbon is from about 1:1 to 20:1, and the molar ratio of inert diluent to oxygen is from about 10:1 to 25:1.

3. A process according to claim 2 wherein said contact is effected by feeding a stream of said paraffin vapor through a fixed bed of said synthetic zeolite such that the ratio of the weight in grams of catalyst in said bed to moles of total feed per hour is less than 12.

4. A process according to claim 3 wherein said synthetic zeolite is an alumino-silicate in which the replaceable metallic ions consist essentially of ions selected from the group consisting of sodium, calcium, and potassium ions.

5. A process according to claim 4 wherein said type

A synthetic zeolite has a formula selected from the group consisting of:

$$0.6K_2O:0.4Na_2O:Al_2O_3:2SiO_2:xH_2O$$

$$1.0Na_2O:Al_2O_3:2SiO_2:xH_2O$$

and $$0.8CaO:0.2Na_2O:Al_2O_3:2SiO_2:xH_2O$$

6. A process according to claim 5 wherein said catalyst is in the form of granules.

7. A process according to claim 4 wherein said contact is effected at a temperature of from about 450° C. to about 550° C., and the ratio of the weight in grams of catalyst in said bed to the moles per hour of total feed to said bed is from 1 to 4.

8. A process according to claim 7 wherein the molar ratio of nitrogen to hydrocarbon in said feed is from 10:1 to 100:1.

9. A process according to claim 8 wherein said inert diluent is nitrogen.

10. A process according to claim 9 where said feed comprises a mixture of $C_{11}$ to $C_{14}$ normal paraffins.

11. A process according to claim 8 wherein said catalyst is a material having a formula selected from the group consisting of:

$$0.6K_2O:0.4Na_2O:Al_2O_3:2SiO_2:xH_2O$$

$$1.0Na_2O:Al_2O_3:2SiO_2:xH_2O$$

and $$0.8CaO:0.2Na_2O:Al_2O_3:2SiO_2:xH_2O$$

and the molar ratio of oxygen to paraffin in the feed stream is at least about 2:1.

References Cited

UNITED STATES PATENTS

| 3,136,713 | 6/1964 | Miale et al. | 208—113 |
| 3,236,910 | 2/1966 | Bukata et al. | 260—683.3 |
| 3,294,858 | 12/1966 | Butler et al. | 260—683 |

DELBERT E. GANTZ, Primary Examiner

G. E. SCHMITKONS, Assistant Examiner

U.S. Cl. X.R.

252—455Z; 260—680E